K. W. BARTLETT.
WATER SOFTENING APPARATUS.
APPLICATION FILED JAN. 22, 1908.

966,071.

Patented Aug. 2, 1910.

Witnesses:

Inventor:
Kent W. Bartlett
G. L. Cragg
By                 Atty

UNITED STATES PATENT OFFICE.

KENT W. BARTLETT, OF MADISON, WISCONSIN, ASSIGNOR TO NORTHERN WATER SOFTENER COMPANY, A CORPORATION OF MAINE.

WATER-SOFTENING APPARATUS.

966,071.  Specification of Letters Patent.  Patented Aug. 2, 1910.

Application filed January 22, 1908. Serial No. 412,113.

*To all whom it may concern:*

Be it known that I, KENT W. BARTLETT, citizen of the United States, residing at Madison, in the county of Dane and State of Wisconsin, have invented a certain new and useful Improvement in Water-Softening Apparatus, of which the following is a full, clear, concise, and exact description, reference being had to the accompanying drawings, forming a part of this specification.

My invention relates to apparatus for governing the flow of material or liquid, and finds a very useful embodiment in water softening apparatus and the invention will be specifically described as embodied in a water softening apparatus, though it is not to be limited thereto.

It is one object of my invention to govern the supply of chemical to the settling tank by the water before it is supplied to the settling tank, additional chemical being desirably supplied to the tank when additional water is added to the tank. The same mechanism that controls the supply of chemical to said tank desirably also controls the supply of additional water to the tank. The said mechanism preferably intermittently effects communication between the settling tank and the fresh water supply and between the settling tank and the chemical supply.

I will point out my invention in the appended claims and will describe the same by reference to the accompanying drawing, showing the preferred embodiment thereof, in which—

Figure 1:
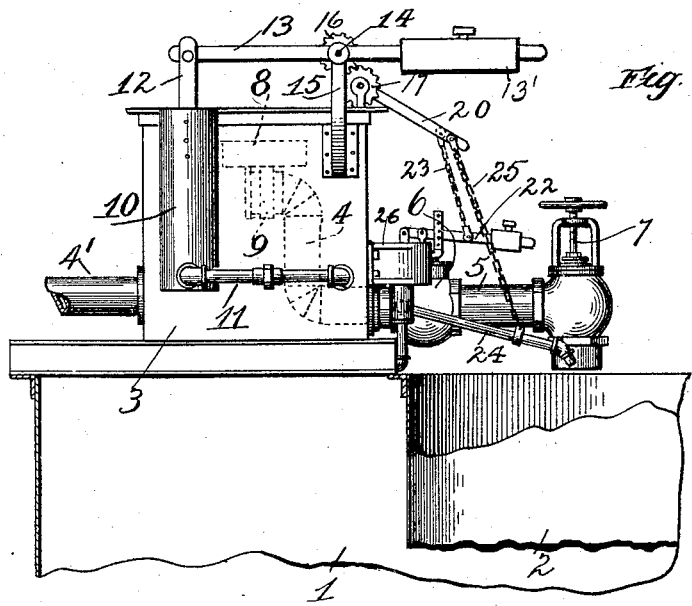
Figure 2:
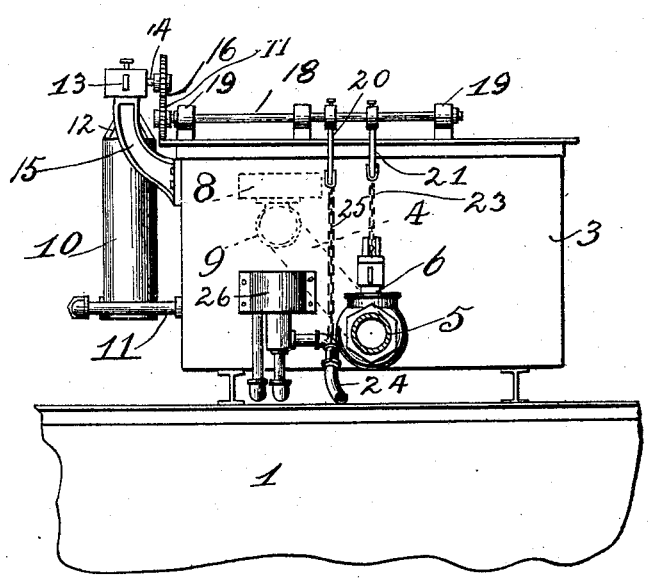

Figure 1 is an end view of apparatus embodying my invention. Fig. 2 is a front view of apparatus embodying my invention.

Like parts are indicated by similar characters of reference in both figures.

The settling tank, which is of well-known construction, is indicated at 1, there being a walled passage 2 within the settling tank, through which the water and chemical are passed into the tank. Above the tank there is illustrated a water supply tank 3 from which a pipe 4' extends to a suitable general supply of water. The tank or chamber 3 contains within it the oscillating section 4 of a discharge pipe, a section 5 of the discharge pipe being located upon the exterior of the tank 3. A valve 6 automatically operated by means of my invention, is included in the section 5 of the discharge pipe, while a hand valve 7 may also be employed to secure a fixed regulation of the discharging capacity of the pipe. A float 8 is yoked at 9 about the intake end of the oscillating section 4 of the discharge spout, the portion of the section 4 encircled by the yoke 9 being free to have rotation within said yoke. The water within the tank 3 that supports the float is maintained above the intake end of the swinging section 4 of the discharge pipe, so that the water may always flow through the discharge piping 4, 5 under a uniform head, irrespective of the vertical position of the intake end of said piping. I provide a bucket 10 whose exterior surface is free of contact with the water within the tank 3, but whose interior is in communication with the interior of the tank 3 by means of swinging piping 11 having one end projecting into the interior of the bucket and the other end projecting into the interior of the tank. The piping communicates with the bottom portion of the bucket and is located near the bottom of the tank 3 and serves to preserve the level of the water within the bucket 10 coincident with the level of the water within the tank 3. The bucket is adapted for vertical movement, it depending from a link 12 connected with a lever 13 mounted upon a shaft 14 supported by a bracket 15 mounted upon the tank 3.

It is the purpose of my apparatus to have the water discharged from the tank 3, when it has been received within said tank in a predetermined maximum quantity. When this quantity has been received within the tank 3, enough water has been received within the bucket 10 to impose a sufficient additional weight upon the lever 13 to cause the lever to rotate in a counter-clockwise direction, by which movement of the lever a pinion 16 fixed upon the shaft 14, rotates in a counter-clockwise direction and causes the clockwise rotation of a pinion 17 meshing therewith. The pinion 17 is fixed upon a shaft 18 carried within bearings 19, also mounted upon the tank 3. Arms 20 and 21 are fixedly secured upon the shaft 18. The arm 21 is coupled with the valve operating mechanism 22 belonging to the valve 6, by means of a chain or cable 23, while the arm 20 is coupled with a swinging chemical discharge spout 24 by means of a chain 25, this swinging discharge spout having communication with a suitable source of chemical supply 26, preferably constructed and arranged as shown in my application Serial No. 394,232, filed September 23, 1907.

When the bucket 10 is depressed upon the tank 3 receiving its maximum amount of water, the valve 6 is opened and the swinging discharge spout 26 is lowered, so that the water may find access to the settling tank 1 through the walled space 2 and a proportionate amount of chemical may find access also to said tank from the discharge spout 24.

When the water in the tank has reached a predetermined lower level, the quantity of water within the bucket 10 may be sufficiently reduced as to sufficiently lighten the weight upon the lever 13, whereupon the righthand end of the lever and the weight $13^1$ carried thereby will overbalance the bucket and cause reverse rotations of the wheels 16 and 17, thereby to elevate the arms 20 and 21 to close the valves 6 and raise the spout 24, thereby to shut off the further flow of water from the tank 3 and the further flow of chemical into the tank as well. During this flow of the water from the tank 3 to the settling tank, the float 8 is constantly descending, but, as hitherto stated, the level of the sinking water in the tank 3 is maintained above the intake end of the swinging section 4 of the discharge pipe, so that the water is discharged into the settling tank but under a uniform head. After the water has been discharged from the tank 3 into the tank 1, the supply of water within the tank 3 is renewed automatically through the pipe 4', the incoming water effecting the elevation of the float 8 and the intake end of the swinging section 4 of the discharge pipe, the water rising within the bucket 10 at the same time, the level of the water within the bucket 10 obviously remaining coincident with the level of the water within the tank 3. The accruing water within the bucket 10 has no operative effect upon the apparatus until the predetermined upper limiting level of the water within the tank 3 has been reached, at which time sufficient water is included within the bucket to effect the downward depression of the lever 13, the opening of the valve 6 and the depression of the discharge spout 26 as hitherto described.

I claim:—

1. An apparatus of the class described including a tank, a source of liquid supply therefor, mechanism for controlling the flow of liquid from said source to said tank, a bucket, and piping for conveying water from said liquid source to said bucket in sufficient quantity to enable said bucket to operate upon said mechanism to permit the flow of liquid to said tank, said piping also affording passage for liquid from said bucket back to the liquid source, whereby the bucket may be lightened to permit the aforesaid mechanism to operate to restrict the flow of liquid to said tank.

2. An apparatus of the class described including a tank, a source of liquid supply therefor, a source of material supply, mechanism for controlling the flow of material from said material source to said tank, a bucket, and piping for conveying water from said liquid source to said bucket in sufficient quantity to enable said bucket to operate upon said mechanism to permit the full flow only of material to said tank, said piping also affording passage for liquid from said bucket back to the liquid source, whereby the bucket may be lightened to permit the aforesaid mechanism to operate to cut off the flow of material to said tank.

3. An apparatus of the class described including a tank, a source of liquid supply therefor, mechanism for controlling the flow of liquid from said source to said tank, a bucket controlling said mechanism, and piping for conveying water from said liquid source to said bucket, said piping also affording passage for liquid from said bucket back to the liquid source, whereby the bucket may be lightened.

4. An apparatus of the class described including a tank, a source of liquid supply therefor, a source of material supply, mechanism for either permitting the full flow only of material from said material source to said tank or to cut off said flow, a bucket controlling said mechanism, and piping for conveying water from said liquid source to said bucket, said piping also affording passage for liquid from said bucket back to the liquid source, whereby the bucket may be lightened.

5. Apparatus of the class described including a tank, a source of liquid supply therefor, and mechanism governed by the level of the liquid in the source of supply, serving to admit liquid from said source of supply to said tank when the liquid in the source of supply reaches a predetermined upper level and serving to cut off the supply of liquid from said source of supply when the liquid in the source of supply reaches a predetermined lower level, said mechanism including a bucket having fluid-conducting means for conveying liquid to the bucket and permitting the discharge of said liquid.

6. Apparatus of the class described including a tank, a source of liquid supply therefor, and mechanism governed by the level of the liquid in the source of supply, serving to admit liquid from said source of supply to said tank when the liquid in the source of supply reaches a predetermined upper level and serving to cut off the supply of liquid from said source of supply when the liquid in the source of supply reaches a predetermined lower level, said mechanism including a bucket having fluid-conducting means for conveying liquid to the bucket from the source of supply and permitting the discharge of said liquid.

7. An apparatus of the class described including a tank, a source of liquid supply therefor, a bucket adapted to receive liquid discharged from said source without it being first discharged into said tank, fluid-conducting means for communication with the fluid in said bucket for permitting the flow of fluid from said bucket to said source of liquid supply to lighten the bucket, and mechanism acting only to permit the full flow of fluid from said source to said tank or to prevent such flow and governed by said bucket.

8. An apparatus of the class described including a tank, a source of liquid supply therefor, mechanism acting only to permit the full flow of fluid from said source to said tank or to prevent such flow, a bucket adapted to receive fluid discharged from said source without it being first discharged into said tank in sufficient quantity to operate upon said mechanism to permit flow of liquid to said tank, and fluid-conducting means for communication with the fluid in said bucket for permitting the flow of fluid from said bucket to said source of liquid supply to lighten the bucket to permit the aforesaid mechanism to operate to shut off the flow of liquid to said tank.

9. An apparatus of the class described including a tank, a source of liquid supply therefor, a bucket, fluid-conducting means for communication with the fluid in said bucket for permitting the flow of liquid from said bucket to said source of liquid supply to lighten the bucket and also serving to permit the flow of fluid from said liquid source into said bucket to make the bucket heavier, and mechanism acting only to permit the full flow of fluid from said source to said tank or to prevent such flow and governed by said bucket.

10. Apparatus of the class described including a tank, a source of liquid supply therefor, a source of chemical supply therefor, and mechanism governed by the level of the liquid in the source of liquid supply serving to admit chemical from said source of chemical supply to said tank when the liquid in the source of liquid supply reaches a predetermined upper level and serving to cut off the supply of chemical from said source of chemical supply when the liquid in the source of liquid supply reaches a predetermined lower level, said mechanism including a bucket having fluid-conducting means for conveying liquid to the bucket from said source of liquid supply and permitting the discharge of said liquid.

11. Apparatus of the class described including a tank, a source of liquid supply therefor, a source of chemical supply therefor, and mechanism governed by the level of the liquid in the source of liquid supply serving to admit chemical from said source of chemical supply to said tank when the liquid in the source of liquid supply reaches one level and serving to cut off the supply of chemical from said source of chemical supply when the liquid in the source of liquid supply reaches another level, said mechanism including a bucket having fluid-conducting means for conveying liquid to the bucket from said source of liquid supply and permitting the discharge of said liquid.

In witness whereof, I hereunto subscribe my name this 21st day of December A. D., 1907.

KENT W. BARTLETT.

Witnesses:
  S. LOEHRER,
  H. A. HEBBARD.